(12) United States Patent
Bhandari et al.

(10) Patent No.: US 11,212,119 B2
(45) Date of Patent: Dec. 28, 2021

(54) REMOTE ATTESTATION OF MODULAR DEVICES WITH MULTIPLE CRYPTOPROCESSORS

(71) Applicant: Cisco Technology, Inc., San Jose, CA (US)

(72) Inventors: Shwetha Subray Bhandari, Bangalore (IN); Eric Voit, Bethesda, MD (US); Jesse Daniel Backman, San Francisco, CA (US); Robert Stephen Rodgers, Mountain View, CA (US); Joseph Eryx Malcolm, Ashburn, VA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 64 days.

(21) Appl. No.: 16/782,235

(22) Filed: Feb. 5, 2020

(65) Prior Publication Data
US 2020/0322176 A1    Oct. 8, 2020

Related U.S. Application Data

(60) Provisional application No. 62/830,060, filed on Apr. 5, 2019, provisional application No. 62/829,869, filed on Apr. 5, 2019.

(51) Int. Cl.
*H04L 29/06* (2006.01)
*H04L 9/32* (2006.01)
(Continued)

(52) U.S. Cl.
CPC ............ *H04L 9/3273* (2013.01); *G06F 21/57* (2013.01); *G06F 21/72* (2013.01); *H04L 9/0825* (2013.01); *H04L 9/3247* (2013.01); *H04L 63/123* (2013.01)

(58) Field of Classification Search
CPC ... H04L 9/3273; H04L 63/123; H04L 9/0825; H04L 9/3247; H04L 9/006; H04L 9/3297;
(Continued)

(56) References Cited

U.S. PATENT DOCUMENTS 9,294,282 B1 *   3/2016   Potlapally ............. H04L 9/3242
9,396,361 B2 *   7/2016   Schmidt ................ G06F 21/725
(Continued)

FOREIGN PATENT DOCUMENTS

CN        107294710 A   * 10/2017
WO   WO-2014196966 A1  * 12/2014    ............. G06F 21/10

OTHER PUBLICATIONS

International Search Report and Written Opinion from the International Searching Authority, dated Jun. 22, 2020, 13 pages, for corresponding International Patent Application No. PCT/US2020/026587.

(Continued)

*Primary Examiner* — Harunur Rashid
*Assistant Examiner* — Hassan A Hussein
(74) *Attorney, Agent, or Firm* — Polsinelli PC

(57) ABSTRACT

A methodology for requesting at least one signed security measurement from at least one module with a corresponding cryptoprocessor is provided. The methodology includes receiving the at least one signed security measurement from the at least one module with the corresponding cryptoprocessor; validating the at least one signed security measurement; generating a signed dossier including all validated signed security measurements in a secure enclave, the signed dossier being used by an external network device for remote attestation of the device.

17 Claims, 8 Drawing Sheets

(51) Int. Cl.
  *G06F 21/72* (2013.01)
  *G06F 21/57* (2013.01)
  *H04L 9/08* (2006.01)

(58) Field of Classification Search
  CPC . H04L 9/3234; H04L 9/3263; H04L 2209/12; H04L 63/12; H04L 41/0866; H04L 41/0266; H04L 43/0817; G06F 21/72; G06F 21/57; G06F 21/64; G06F 21/572; G06F 21/575; G09C 1/00
  See application file for complete search history.

(56) References Cited

U.S. PATENT DOCUMENTS

| | | | | |
|---|---|---|---|---|
| 9,509,720 | B2* | 11/2016 | Shenefiel | H04L 9/088 |
| 10,735,308 | B2* | 8/2020 | Voit | H04L 63/12 |
| 2007/0143629 | A1* | 6/2007 | Hardjono | H04L 63/0823 |
| | | | | 713/189 |
| 2009/0049510 | A1* | 2/2009 | Zhang | G06F 21/79 |
| | | | | 726/1 |
| 2011/0067095 | A1* | 3/2011 | Leicher | H04L 63/062 |
| | | | | 726/10 |
| 2013/0263205 | A1* | 10/2013 | Jacobs | G06F 21/57 |
| | | | | 726/1 |
| 2013/0312125 | A1* | 11/2013 | Schmidt | H04W 12/10 |
| | | | | 726/36 |
| 2014/0006776 | A1* | 1/2014 | Scott-Nash | G06F 21/57 |
| | | | | 713/156 |
| 2015/0033012 | A1* | 1/2015 | Scarlata | H04L 9/3242 |
| | | | | 713/161 |
| 2016/0350534 | A1* | 12/2016 | Poornachandran | H04L 9/3273 |
| 2017/0024570 | A1* | 1/2017 | Pappachan | G06F 21/602 |
| 2017/0161505 | A1* | 6/2017 | Campagna | G06F 9/45558 |
| 2017/0255780 | A1* | 9/2017 | Hughes | G06F 3/0631 |
| 2018/0109561 | A1* | 4/2018 | Kegel | H04L 9/3234 |
| 2019/0182044 | A1* | 6/2019 | Mullen | G06Q 20/3829 |
| 2020/0204476 | A1* | 6/2020 | Voit | H04L 45/02 |
| 2020/0322348 | A1* | 10/2020 | Kathail | H04L 63/108 |
| 2020/0322353 | A1* | 10/2020 | Bhandari | H04L 63/123 |
| 2021/0144584 | A1* | 5/2021 | Chandra | H04W 76/15 |
| 2021/0152468 | A1* | 5/2021 | Anandakrishnan | H04L 45/54 |

OTHER PUBLICATIONS

Fuchs, A., et al., "Time-Based Uni-Directional Attestation," draft-birkholz-rats-tuda-00, Mar. 12, 2019, pp. 1-68.

* cited by examiner

REMOTE ATTESTATION OF MODULAR DEVICES WITH MULTIPLE CRYPTOPROCESSORS

CROSS-REFERENCE TO RELATED APPLICATIONS

This application is related to and claims priority under 35 U.S.C. § 119(e) to U.S. Patent Applications No. 62/830,060, filed Apr. 5, 2019 and No. 62/829,869, filed Apr. 5, 2019, the entire contents of which are incorporated herein by reference for all purposes.

TECHNICAL FIELD

The present disclosure generally relates to the field of computer networking, and more particularly to assessing reliability and trustworthiness of devices operating within a network.

BACKGROUND

Modern networking devices are increasingly modular, wherein line cards, route processors, or other modules can be inserted or removed from a supervisor device. On top of their modularity, these modules often come equipped with their own cryptoprocessors, which require security validation above and beyond validation of the supervisor device's cryptoprocessors. However, current methods do not provide a means to validate all cryptoprocessors in a device that persists across its lifetime independent of which modules are present.

BRIEF DESCRIPTION OF THE FIGURES

To provide a more complete understanding of the present disclosure and features and advantages thereof, reference is made to the following description, taken in conjunction with the accompanying drawings, in which.

DETAILED DESCRIPTION

Figure 1:
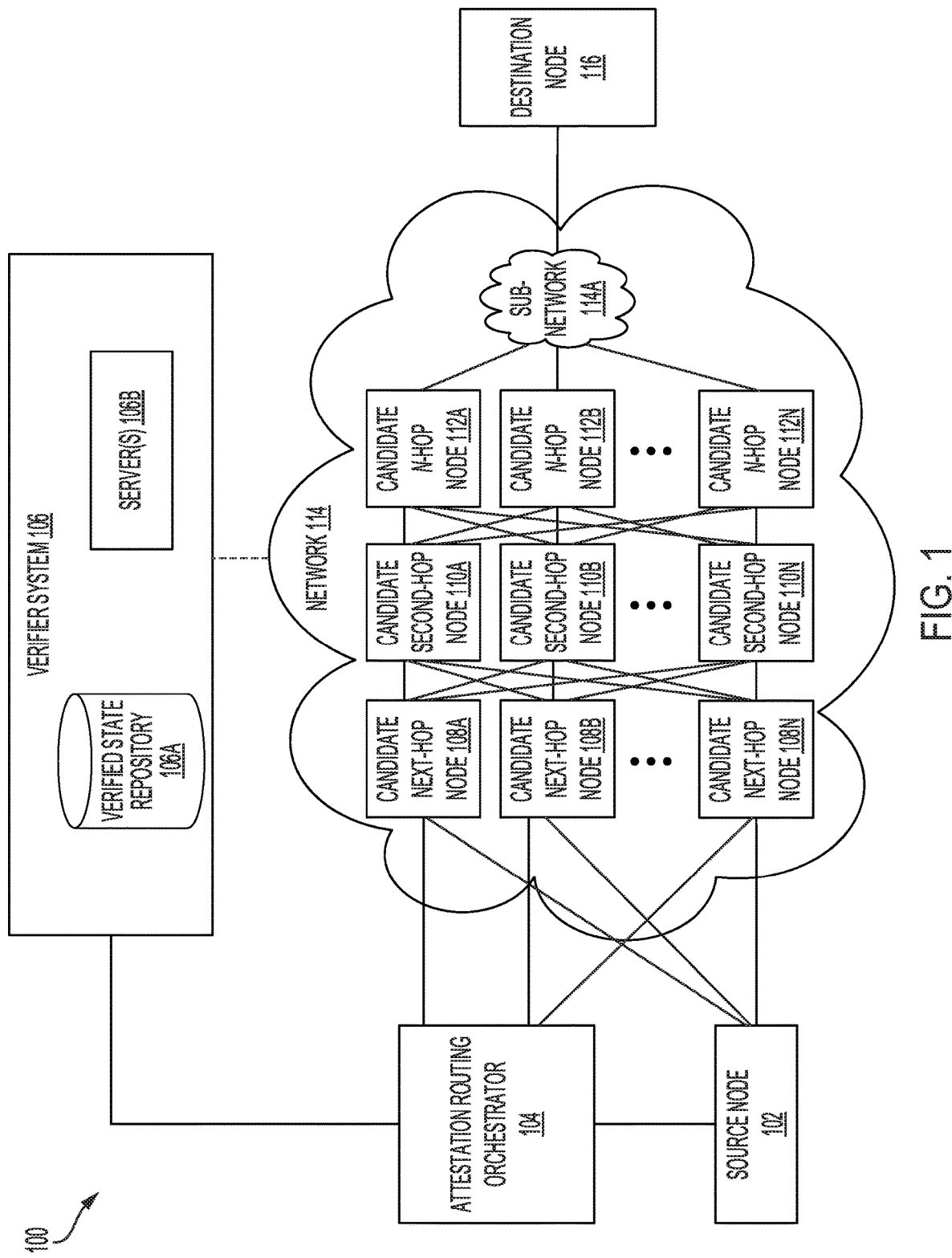
FIGS. 1 through 3 illustrate example networking environments in accordance with some examples.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

The disclosed technology presents a solution for verification of modular networking devices with multiple cryptoprocessors. The solution details methods, systems, and non-transitory computer-readable media for creating a signed attestation bundle (a single signed envelope) for such supervising (modular) devices that can be indicative of signed and verified status of all constituent devices residing within the supervising device. Such single signed envelopes may be created using an attestation key that is not tied to a specific hardware on which the supervising device is deployed, allowing it to persist across hardware iterations of the modular device.

A method can include requesting at least one signed security measurement from at least one module with a corresponding cryptoprocessor, the at least one module existing within a device; receiving the at least one signed security measurement from the at least one module with the corresponding cryptoprocessor; validating the at least one signed security measurement; generating a signed dossier including all validated signed security measurements in a secure enclave, the signed dossier being used by an external network device for remote attestation of the device.

A non-transitory computer-readable medium can include instructions stored therein which, when executed by at least one processor, cause the at least one processor to request a plurality of signed security measurements from a plurality of modules with corresponding cryptoprocessors, the plurality of modules existing within a device; receive the plurality of signed security measurements from the plurality of modules with corresponding cryptoprocessors; validate the plurality of signed security measurement; generate a signed dossier including all validated signed security measurements in a secure enclave, the signed dossier being used by an external network device for remote attestation of the device.

A system can include a computing device, the computing device comprising at least one module with a corresponding cryptoprocessor; a secure enclave; and a supervisor cryptoprocessor configured to request at least one signed security measurement from the at least one module with the corresponding cryptoprocessor, receive the at least one signed security measurement from the at least one module with the corresponding cryptoprocessor, validate the at least one signed security measurement, generate a sign dossier including all validated signed security measurements in the secure enclave, the signed dossier being used by an external network device for remote attestation of the device.

Example Embodiments

The disclosed technology addresses the need in the art for verification of modular networking devices with multiple cryptoprocessors. Modern networking devices often hold modules, such as line cards or routers, which contain their own cryptoprocessors in addition to the cryptoprocessors held in the supervising device. This disclosure provides non-limiting examples for creating a signed attestation bundle (a single signed envelope) for such supervising (modular) devices that can be indicative of signed and verified status of all constituent devices residing within the supervising device. Such single signed envelope may be created using an attestation key that is not tied to a specific hardware on which the supervising device is deployed. Prior to describing such examples embodiments, several example configurations in which the above concepts can be deployed and utilized, will be described first.

The disclosure now turns to an initial discussion of example concepts and technologies for providing verifiable proof of integrity of network nodes traversed by packets.

A computer network can include different nodes (e.g., network devices, client devices, sensors, and any other computing devices) interconnected by communication links and segments for sending data between end nodes. Many types of networks are available, including, for example, local area networks (LANs), wide area networks (WANs), software-defined networks (SDNs), wireless networks, core networks, cloud networks, the Internet, etc. When data traffic is transmitted through one or more networks, the data traffic typically traverses a number of nodes that route the traffic from a source node to a destination node.

While having numerous nodes can increase network connectivity and performance, it also increases security risks as each node that a packet traverses introduces a risk of unauthorized data access and manipulation. For example, when a packet traverses a node, there is a security risk that is introduced which can result from the node being potentially compromised (e.g., hacked, manipulated, captured, etc.). As a result, compliance, security, and audit procedures can be implemented to verify that network users, devices, entities and their associated network traffic comply with specific business and/or security policies.

When sensitive information is transmitted through nodes in a network, such as in battlefield, banking settings, and healthcare settings, such traffic should be sent through uncompromised nodes to prevent access to, leakage of, or tampering with the data and sensitive information carried by that traffic. If an attacker gains access to a device via some exploit, previous protection and encryption approaches for network interfaces are generally ineffective at mitigating or addressing such unauthorized access and resulting damage.

Proving that network traffic complies with specific policies can involve proving in a secure way that the traffic has traversed a well-defined set of network nodes (e.g., firewalls, switches, routers, etc.) and that such network nodes have not been modified or compromised. This can help ensure that the network nodes have performed their expected or intended actions (e.g., packet processing, security or policy compliance verification, routing, etc.) on the packet and that the packet has traversed the network nodes.

Some security approaches can aim at removing any implied trust in the network used for connecting applications hosted on devices to cloud or enterprise hosted services. Moreover, some security approaches can be implemented to verify the trustworthiness (e.g., the integrity, identity, state, etc.) of the network and/or nodes traversed by packets. In some cases, certain verification checks can be implemented to validate or verify that traffic has traversed a specific set of nodes and that such nodes are trusted and uncompromised. In some examples, certain Proof-of-Transit (POT), Trusted Platform Module (TPM), attestation, or proof of integrity approaches can be implemented to verify or validate the trustworthiness of a node in a network.

POT can enable a network user or entity to verify whether traffic traversed a defined set of network nodes. Attestation, as further described below, can also be used to verify the integrity of a node. In some cases, the approaches herein can integrate both to offer a secure approach that allows network users or entities to verify that traffic has traversed a defined set of nodes and that such nodes have not been compromised.

In some cases, TPM can be implemented to collect and report the identity of hardware and software components in a platform to establish trust for that platform. A TPM used in a computing system can report on the hardware and software of the system in a manner that allows verification of expected behavior associated with that system and, from such expected behavior, establishment of trust. The TPM can be a system component containing state that is separate from the host system on which the TPM reports identity and/or other information. TPMs can be implemented on physical resources (indirectly or directly) of the host system. In some examples, a TPM component can have a processor and memory such as RAM, ROM and/or flash memory. In other implementations of a TPM, a host processor can run TPM code while the processor is in a particular execution mode. Parts of system memory can be partitioned by hardware to ensure that memory used by the TPM is not accessible by the host processor unless the host processor is in the particular execution mode.

In some cases, trusted computing (TC) implementations, such as TPM, can rely on Roots of Trust. Roots of Trust can be system elements that should be trustworthy because misbehavior by such system elements may not be detectable.

A set of roots can provide a minimum functionality that can sufficiently describe characteristics that affect a platform's trustworthiness. In some cases, determining if a Root of Trust is behaving properly may not be possible; however, it may be possible to determine how roots are implemented. For example, certificates can provide assurances that the root has been implemented in a way that renders it trustworthy.

To illustrate, a certificate may identify the manufacturer and evaluated assurance level (EAL) of a TPM. Such certification can provide a level of confidence in the Roots of Trust used in the TPM. Moreover, a certificate from a platform manufacturer may provide assurance that the TPM was properly installed on a system that is compliant with specific requirements so the Root of Trust provided by the platform may be trusted. Some implementations can rely on three Roots of Trust in a trusted platform, including Root of Trust for Measurement (RTM), Root of Trust for Storage (RTS), and Root of Trust for Reporting (RTR).

The RTM can send integrity information, such as integrity measurements, to the RTS. Generally, the RTM can be a processor controlled by a Core Root of Trust for Measurement (CRTM). The CRTM is the first set of instructions executed when a new chain of trust is established. When a system is reset, the processor (e.g., RTM) can execute the CRTM, which can then send values that indicate its identity to the RTS. Thus, in some cases, the starting point for a chain of trust can be established in this manner.

As previously noted, the TPM memory can be shielded from access by an entity other than the TPM. Since the TPM can be trusted to prevent unauthorized access to its memory, the TPM can act as an RTS. Moreover, the RTR can report on the contents of the RTS. An RTR report can be a digitally signed digest of the contents of one or more values in a TPM.

Attestation is another example trusted computing approach that can be used to verify the integrity of a node. Attestation can be applied to a node, such as a router or switch, to review logs from connected devices, such as Layer 1 (L1) or Layer (L2) connected devices and maintain these logs in trusted storage. These logs can be protected by embedding a private key into every trust anchor produced for a hardware device and publishing the device's public key as a certificate to adjacent devices. This peering device can then push log updates from trusted storage periodically and/or on some log entry event. Reviewing any provided signed logs can provide an understanding of the current trustable state of a peer device. Moreover, by looking back at the set of transactions which have occurred since boot time, a determination can be made regarding the trustworthiness of the information which that peer device is asserting.

In some examples, metadata elements containing security measurements or evidence, can be used to provide verifiable evidence of device trustworthiness (e.g., integrity, state, etc.). The metadata elements can include applicable data for verifying trustworthiness of a device and be provided through an applicable technique for verifying device trustworthiness. For example, the metadata elements can be provided as part of a canary stamp associated with the device. A canary stamp can indicate or otherwise include a signed measurement associated with a device for verifying trustworthiness of the device. In turn, such measurements can be referred to as canary stamps because each signed measurement is like a stamp proving its authenticity, and like a canary in a coal mine that indicates an early sign of trouble. Such verifiable evidence can be appended or included in packets transmitted by nodes on a network. The metadata elements can thus be used to evaluate the trustworthiness of a node(s) and react accordingly. For example, a device or entity can review metadata element associated with a node to determine that the node should not be trusted and adjust a network policy to mitigate possible damage.

In some implementations, dedicated cryptoprocessors, such as a processor in TPM platform, can take measurements to attest to the trustworthiness (e.g., identity, integrity, etc.) of a node and its environment (e.g., software, hardware, operating system, running binaries, firmware, etc.). These measurements include evidence that the node is in a safe state. In some cases, these measurements can be provided through canary stamps, as previously described. However, a receiver of such evidence should be able to certify that the evidence is fresh, as the evidence can become stale thereby potentially reducing its effectiveness in reflecting the current trustworthiness of a node. For example, without ensuring freshness of such evidence, an attacker has an opening to inject previously recorded measurements and asserting what is replayed as being current.

Some approaches can detect the replaying of old evidence via a "nonce". A nonce is an arbitrary number that can be used to introduce randomness. In some instances, a nonce can be used just once in a cryptographic communication. Further, a nonce can be passed into a TPM and/or incorporated into a canary stamp/metadata. In some cases, a result provided by the TPM can include a signature based on the nonce. Since the nonce can be grounded in a transactional challenge/response interaction model, in some cases the nonce may be less effective with unidirectional communications originating from an attesting device. For example, a nonce may less effective with an asynchronous push, multicast, or broadcast message.

However, there are numerous use cases where a platform assessing whether its peers are trustworthy is advantageous. Being able to perform a unidirectional attestation using an asynchronous push, multicast, or broadcast message in conjunction with trusted binaries opens many possibilities for platforms to assess whether their peers are trustworthy. Detection of invalid attestations can trigger alarms or events, reduction of network access from a suspect device, or can become a part of Admission Control (e.g., IEEE 802.1X). Some platforms can be configured to support the unidirectional attestation mechanism.

Other freshness approaches can be based on trusted computing capabilities, such as TPM. For example, a token can be generated which allows external entities to validate freshness of asserted data based on the state of internal counters within the TPM. This token can be used to detect replay attacks, and provide attestation for asynchronous push, multicast, and broadcast messages.

Various of the foregoing approaches can be combined with TPM-integrated capabilities aimed at verifying that valid compute components, such as binary processes, are running on a node. These capabilities can include, for example, Trusted Execution Environments (TEE) which provide runtime malware protections, Authenticated Code Modules (ACM) which ensure that only digitally-signed code modules can be loaded into a processor, and the like. These technologies can validate that a processor is running known software with a valid chain of binary signatures.

In some cases, metadata elements, e.g. canary stamps, and tokens can be created by extracting current counters (e.g., clock, reset, restart) from a node's TPM, and incorporating such counters and security measures taken from the node into a packet. In some examples, the current counters and/or security measures can be hashed with information within an external TPM. The metadata elements and tokens can thereby provide a non-spoofable token or metadata element, which can bind continuously incrementing counters on an attestee with a known external state. Any resetting of the TPM counters is visible in any subsequent TPM queries, and any restarting of a platform is also exposed in subsequent TPM queries. Within these bounds of reset and restart, the TPM's time ticks counter continuously increments. Therefore, any push of attestee TPM information which includes these counters can be determined to have occurred subsequent to any previously-received measurement. Also, if the reset and restart counters have not changed, the incremental time since any previous measurement can also be known.

In some cases, a large amount of information that should be trusted by network peers may not be contained within the TPM's Program Configuration Registers (PCR). As a result, indirect methods of validating that a node has not been compromised can be applied.

The receipt of the metadata elements, e.g. canary stamps, and/or tokens can mean that a receiver should have the option of verifying the information. In many cases, such verification can be performed without the need of supplementary evidence being sent with the canary stamp. Moreover, in non-controller based or centralized implementations, the verification steps do not have to occur at the receiver.

In some integrity verification implementations, a controller or device can implement an integrity verification application. The integrity verification application can be designed to recognize change events and evaluate known good values, which allow evaluation of a boot-integrity stamp and a running process binary signature stamp based on, for example, TPM counters, timestamps, nonces, and/or time tokens. On any discrepancy, a controller or centralized device can isolate a compromised node from its network peers by shutting down the interfaces of the node.

In some examples, the metadata elements, e.g. canary stamps, and/or verifications for integrity can be implemented, such as a measured-boot stamp (e.g., SHA1 hash over PCRs 0-7), a verified-boot stamp (e.g., which can verify that only recognized binaries were executed when booting), a process-stamp (e.g., root-of-trust validated through a process which is asserting a particular protocol or protocols), a file-system stamp (e.g., all files within a vendor determined set of directories), a log-integrity stamp (e.g., used to augment existing integrity analytics and forensics), a configuration stamp (e.g., State of the current device configuration), etc. Some implementations can achieve all or some of these stamps, depending on the implementation. Moreover, in some implementations, all or some of these stamps can be implemented or achieved using a single or multiple stamps.

As previously explained, TPM provides methods for collecting and reporting the identity of hardware and software components in a platform to establish trust for that platform. TPM functionality can be embedded in a variety of devices including mobile phones, personal computers, network nodes (e.g., switches, routers, firewalls, servers, network appliances, etc.), and/or any other computing devices. Further, attestation can describe how the TPM can be used as a hardware root of trust and offer proof of integrity of a node. Such integrity can include hardware integrity, software integrity (e.g., micro loader, firmware, boot loader, kernel, operating system, binaries, files, etc.), and runtime integrity.

In some cases, TPM and attestation can be implemented as described herein to provide proof of integrity and proof of transit through uncompromised nodes. In some examples, metadata elements and tokens containing or reflecting security measures are used as previously mentioned to validate the integrity of a node and perform continuous evaluation of node integrity. Thus, the metadata elements and tokens described herein can be used to provide proof of transit through uncompromised nodes.

In some examples, the metadata elements and tokens can be added as additional metadata to packets that traverse a network where proof of transit via uncompromised nodes is desired. Various strategies can be implemented for transporting the metadata elements and tokens in a packet. In some cases, the metadata elements and tokens can be carried within an In-Situ (or in-band) Operations, Administration and Management (IOAM) data field.

In some implementations, the metadata elements and tokens can be carried with IOAM trace data. For example, a canary stamp can be carried as part of an IOAM data field in a variety of encapsulation protocols such as, for example and without limitation, IPv4, IPv6, NSH (Network Service Header), etc. In some cases, the canary stamp can be carried in an IOAM data field as an IOAM Trace option data element (e.g., with an IOAM Trace type for node integrity canary stamp). A metadata element, token, or digest, e.g. canary stamp digest, can be added in the IOAM trace option of a packet by each node that forwards the packet.

When the packet reaches a node (e.g., the destination node and/or an intermediate node) that removes IOAM metadata (e.g., an IOAM decapsulating node), the validity of the metadata element and/or token in the packet can be verified to determine that the packet traversed uncompromised nodes. In some examples, since canary stamps are time bound, the packet trace timestamps defined in IOAM can be used to validate the canary stamp in the time window the packet traversed that node.

Verification can be performed without placing a large transactional load on the verifier or a device, such as a controller, that will ultimately validate the security measurements associated with the metadata elements or tokens. This is because the measurement values can often change infrequently. The verifier may only need to validate a metadata element and/or token carried within an IOAM data trace whenever the associated security measurements associated change (e.g., a verifier may only need to check with a controller whenever it sees a node's TPM extend a PCR value which was not previously confirmed by the verifier).

In some cases, when only the time ticks within a signed metadata element increases, only the signature of the metadata element is validated. To do this, the verifier may use the public key of any node which can place a metadata element. Such signature validation can be done without using a controller to verify the measurements.

In another example, a packet can carry IOAM POT data with space optimization of metadata element values, e.g. canary stamp values. For example, a new IOAM POT data field can carry a canary stamp or a hash extend of a canary stamp and, in turn, canary stamp data can be carried across nodes. In some cases, a canary stamp hash extend can be a similar method as PCR extend operation performed by TPMs.

In some cases, the canary stamp hash can provide a one-way hash so that a canary stamp recorded by any node cannot be removed or modified without detection. IOAM proof of transit option data for a canary stamp digest can be defined by a hash algorithm (e.g., 20 octets with SHA1, 32 octets with SHA 256, etc.). In some implementations, each node along a path of the packet can forward the packet with a new or updated canary stamp digest. In some examples, the new or updated canary stamp digest can be generated by a node as follows: IOAM canary stamp digest new value=Digest of (IOAM canary stamp digest old value II hash(canary stamp of the node)), where the IOAM canary stamp digest old value can refer to the canary stamp digest included in the packet by one or more previous hops.

Moreover, in some cases, a Per Packet Nonce (PPN), where PPN changes per packet and is carried as another field within the IOAM metadata option, can be added to provide robustness against replay attacks. To illustrate, in some examples, a PPN can be added as follows: IOAM canary stamp digest new value=Digest of (IOAM canary stamp digest old value II hash(canary stamp of the node II PPN)). A node creating the new value for the IOAM canary stamp digest can thus take the value of any previous IOAM canary stamp digest and extend/hash that value with the node's current canary stamp. The result of the concatenation and hashing can then be written into IOAM POT data (or other IOAM data fields) as the new IOAM canary stamp digest.

At the verifier (e.g., the device verifying the canary stamp data), the same operation can be performed over expected canary stamp values calculated for the nodes that are traversed in the time window when the packet was forwarded. A verifier can be an inline device or a centralized device. Moreover, in some examples, nodes that are expected to be traversed can be identified using IOAM tracing, routing state or by sending active probes. A match between the value of POT data carrying specific metadata elements, e.g. a canary stamp digest and the expected canary stamp value, can prove that the packet traversed through trusted or uncompromised nodes.

In some examples, one or more strategies can be implemented to optimize metadata element validation. For example, metadata elements, e.g. canary stamps, can detect attempts of a replay attack by embedding a nonce as well as TPM or TPM2 counters (e.g., clock, reset, restart). In some cases, this nonce can be part of the metadata elements and different from the PPN described above.

The nonce is relevant to a receiver as the interval from the nonce's creation time to the first stamp received by the verifier can define the interval of freshness (e.g., the measurement is no older than this interval of freshness). From there, the TPM2 time ticks counter can be used to maintain that initial gap of freshness even without the delivery of a new nonce.

In some implementations, to optimize metadata element or token validation across nodes, the following approaches can be implemented to deliver synchronization information from a central component to each node and the verifier. For example, a central server can broadcast or multicast centralized nonce values (e.g., tracked random numbers). Each node can pick up the latest nonce and use it to attest a value. A verifier can know the freshness of a metadata element or token it receives from each node. This freshness can be the delta in time since that particular nonce was issued. Subsequent attestations can use the incrementing time ticks to prove freshness from that initial time gap. In some cases, the issuing of new nonces can reset the time gap to a potentially shorter interval.

Moreover, in some cases, each node can embed attested time within its metadata element. To get attested time, a TUDA (Time-Based Uni-Directional Attestation) scheme such as the TUDA scheme described in https://tools.ietforg/id/draft-birkholz-i2nsf-tuda-01.html, the contents of which are incorporated herein by reference in their entirety, can be used. This can result in the availability of both the attested time at a node, as well as the value of the TPM2 counters at this node when a TUDA time-synchronization token was created. This can eliminate the use of a central nonce authority, but can increase the size of the metadata element as the nonce can be replaced by the TUDA time-synchronization token. This approach may also implement a central timestamp authority as per TUDA. In some examples, for each hop, a canary stamp digest value can be: IOAM canary stamp digest new value=Digest of (IOAM canary stamp digest old value II hash(canary stamp of the node II TUDA time-synchronization token of the node)).

This approach can provide numerous benefits. For example and without limitation, with this approach, a verifier can limit the number of verifications by verifying the signature of a hop's time-synchronization token only when it changes. Moreover, with this approach, there may not be a time gap nonce changeover freshness when a first measurement is received. Further, in some cases, this approach can be implemented without also carrying a PPN or without synchronizing a nonce across nodes as previously described.

Further, an attestor, e.g. a node or a verifier, can use random numbers, otherwise pseudo-random numbers, created by peers and/or the attestor to generate and verify attestation information. Specifically, the attestor can accumulate random numbers from one or more layer 2 peers. The random numbers can be accumulated from the peers over a specific amount of time, e.g. a short duration of time. In turn, the random numbers can be combined into a number through an applicable technique, e.g. a Bloom filter. This number can serve as a nonce for a cryptoprocessor for generating a result. As follows, the layer 2 peers, potentially including the attestor, can use the result created by the cryptoprocessor, to verify/validate that their corresponding provided random number was used in generating the nonce ultimately used by the cryptoprocessor to create the result. In turn, the layer 2 peers, potentially including the attestor, can generate verified attestation information based on the random numbers generated by the peers, the nonce created from the random numbers, and/or the result created by the cryptoprocessor from the nonce.

Having provided an initial discussion of example concepts and technologies for providing explicit verifiable proof of integrity of network nodes traversed by packets, the disclosure now turns to FIG. 1.

FIG. 1 is a block diagram of an example of networking environment 100 in accordance with some implementations. While pertinent features are shown, those of ordinary skill in the art will appreciate from the present disclosure that various other features have not been illustrated for the sake of brevity and so as not to obscure aspects of the example implementations disclosed herein.

In this example, the networking environment 100 can include a network 114 of interconnected nodes (e.g., 108A-N, 110A-N, and 112A-N). The network 114 can include a private network, such as a local area network (LAN), and/or a public network, such as a cloud network, a core network, and the like. In some implementations, the network 114 can also include one or more sub-networks, such as sub-network 114A. Sub-network 114A can include, for example and without limitation, a LAN, a virtual local area network (VLAN), a datacenter, a cloud network, a wide area network (WAN), etc. In some examples, the sub-network 114A can include a WAN, such as the Internet. In other examples, the sub-network 114A can include a combination of nodes included within a LAN, VLAN, and/or WAN.

The networking environment 100 can include a source node 102. The source node 102 can be a networking device (e.g., switch, router, gateway, endpoint, etc.) associated with a data packet that is destined for a destination node 116. The source node 102 can communicate with candidate next-hop nodes 108A-N on the network 114. Each of the candidate next-hop nodes 108A-N can be included within a respective route between the source node 102 and the destination node 116. Moreover, in some cases, each of the candidate next-hop nodes 108A-N can communicate with candidate second hop nodes 110A-N in the network 114. Each of the candidate second hop nodes 110A-N can similarly communicate with candidate N-hop nodes 112A-N in the network 114.

The networking environment 100 can also include an attestation routing orchestrator 104. The attestation routing orchestrator 104 can communicate with the candidate next-hop nodes 108A-N. In some implementations, the attestation routing orchestrator 104 can obtain attestation data (e.g., canary stamps, security measures, signatures, and/or metadata) or vectors from the candidate next-hop nodes 108A-N. In some examples, the attestation routing orchestrator 104 can obtain additional information from candidate second-hop nodes 110A-N and/or candidate N-hop hop nodes 112A-N and utilize the additional information in selecting a particular candidate next-hop node for a packet. In some implementations, the attestation routing orchestrator 104 can also obtain additional information from nodes that are more than two hops away (e.g., candidate third hop nodes, candidate fourth hop nodes, etc.).

The attestation routing orchestrator 104 can communicate with a verifier system 106. While, the verifier system 106 is conceptually shown as being implemented separate from the network 114, the verifier system 106 can be implemented within the network 114, e.g. as part of a network device in the network 114. In some implementations, the attestation routing orchestrator 104 can obtain trusted state, such as a trusted image vector, from the verifier system 106. The verifier system 106 can include a verified state repository 106A and one or more servers 106B. In some examples, the verified state in the verified state repository 106A can include one or more verified images, verified security measurements, verified settings, verified node data, and/or any other verified trust or integrity data. In some implementations, the verified state in the verified state repository 106A can include one or more trusted states or image vectors that are known with a degree of confidence to represent uncompromised states or images (e.g., states or images that have not been hacked, attacked, improperly accessed, etc.).

As will be described in great detail with reference to FIG. 4, in some cases, the attestation routing orchestrator 104 can select and direct a data packet to a particular candidate next-hop node of the candidate next-hop nodes 108A-N based on a trusted state or image vector and the attestation states or vectors. Moreover, the attestation routing orchestrator 104 can direct the data packet destined for the destination node 116 to the particular candidate next-hop node.

Figure 2:
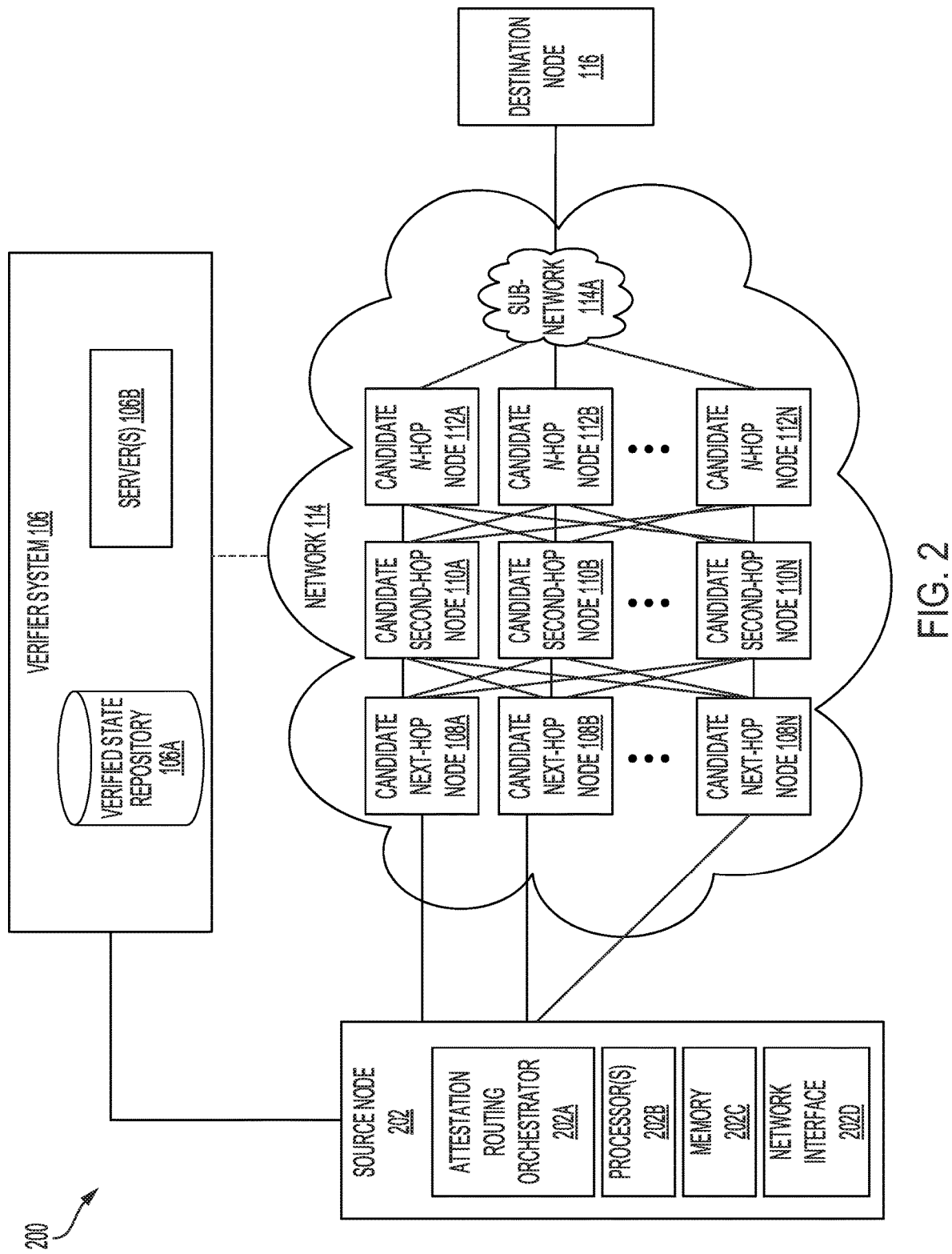

FIG. 2 is a block diagram of another example networking environment 200 in accordance with some implementations. In this example, the networking environment 200 includes a source node 202 that implements an attestation routing orchestrator 202A. In some implementations, the attestation routing orchestrator 202A can be similar to, or adapted from, the attestation routing orchestrator 104 in FIG. 1.

The source node 202 can include one or more processors 202B. In some implementations, the one or more processors 202B can provide processing resources for generating a confidence scores for the candidate next-hop nodes 108A-N. In some implementations, the one or more processors 202B can provide processing resources for selecting a particular confidence score, from the confidence scores, that satisfies one or more selection criteria.

In some examples, the source node 202 can include a memory 202C. The memory 202C can be, for example and without limitation, a non-transitory memory, such as RAM (random-access memory), ROM (Read-only memory), etc. The memory 202C can store the data, such as the packet destined for the destination node 116. In some implementations, the memory 202C can store a trusted state or image vector obtained from the verifier system 106. In some implementations, the memory 202C can store attestation states or vectors obtained from the candidate next-hop nodes 108A-N and optionally attestation states or vectors obtained from the candidate second hop nodes 110A-N and/or the candidate N-hop nodes 112A-N. The source node 202 can also include a network interface 202D for obtaining, receiving, and transmitting the data packets and states or vectors.

In some implementations, the source node 202 can select and direct a data packet to a particular candidate next-hop node based a trusted state or image vector and the attestation states or vectors.

Figure 3:
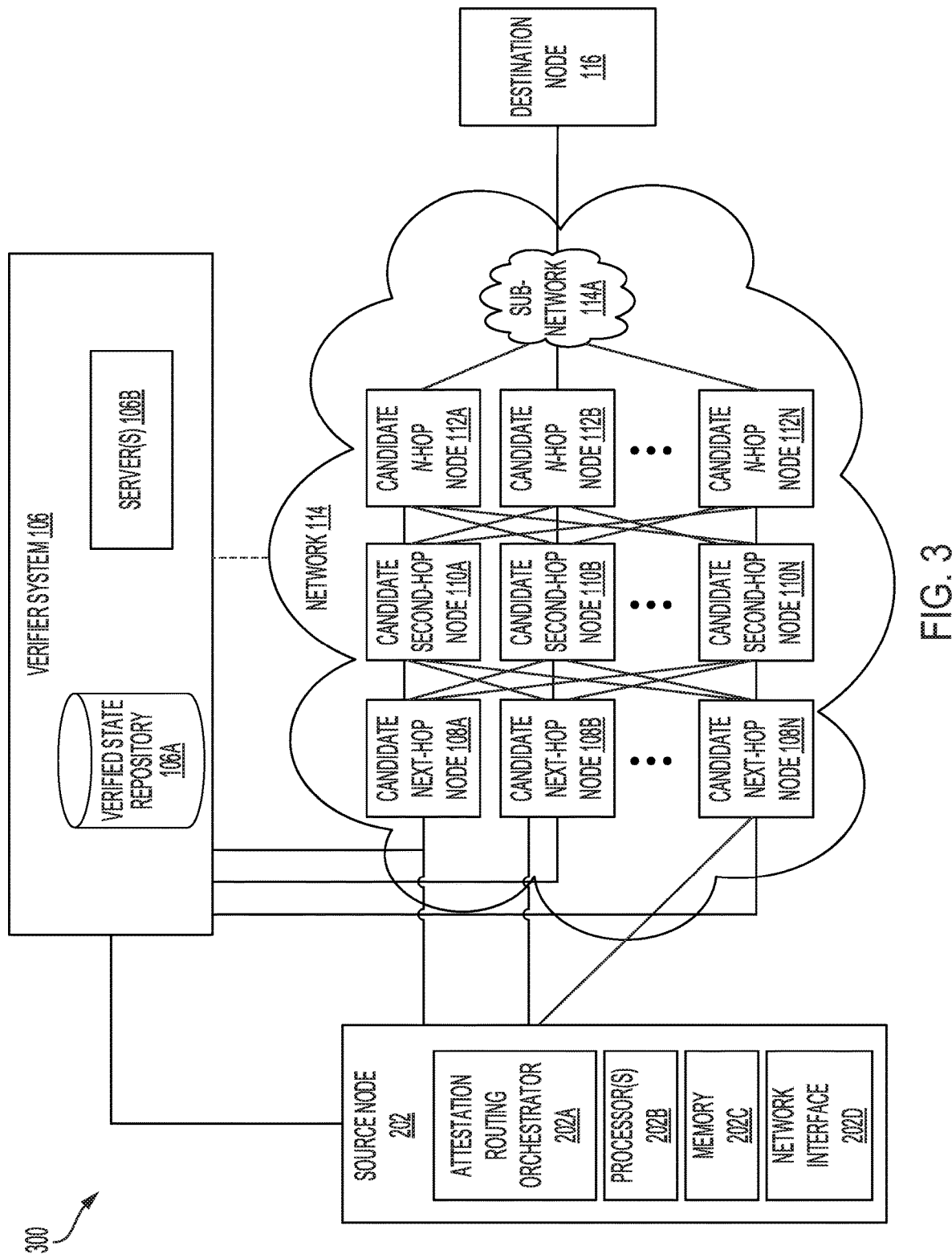

FIG. 3 is a block diagram of another example networking environment 300 in accordance with some implementations. In this example, one or more of the candidate next-hop nodes 108A-N can relay a trusted state or image vector from the verifier system 106 to the source node 302. In some implementations, the attestation routing orchestrator 302A can be similar to, or adapted from, the attestation routing orchestrator 104 in FIG. 1 and/or the attestation routing orchestrator 202A in FIG. 2.

In some implementations, the verifier system 106 can sign the trusted state or image vector and provide the signed trusted state or image vector to a particular candidate next hop node, which in turn can provide the signed trusted state or image vector to the source node 302. In some implementations, having the particular candidate next hop node provide the signed trusted state or image vector can reduce attestation time (e.g., the time to determine trustworthiness of the particular candidate next hop node) because the source node 302 may not need to contact a remote node (verifier system 106). In some implementations, attestation time can be further reduced because a single attestation process (e.g., the verifier system 106 signing the trusted state or image vector) facilitates the attesting of multiple source nodes. In other words, trusted states or image vectors may not be generated and evaluated on a per source node basis.

Moreover, in implementations in which the source node 302 is not connected to the verifier system 106 (e.g., link down), obtaining the trusted state or image vector from the particular candidate next hop provides an alternative mechanism for node attestation. In some implementations, the verifier system 106 appends a time-stamped response to the trusted state or image vector as part of the signing process, which can be referred to as stapling. Consequently, the source node 302 may not contact the verifier system 106 in order to attest a particular candidate next hop node.

Figure 4:
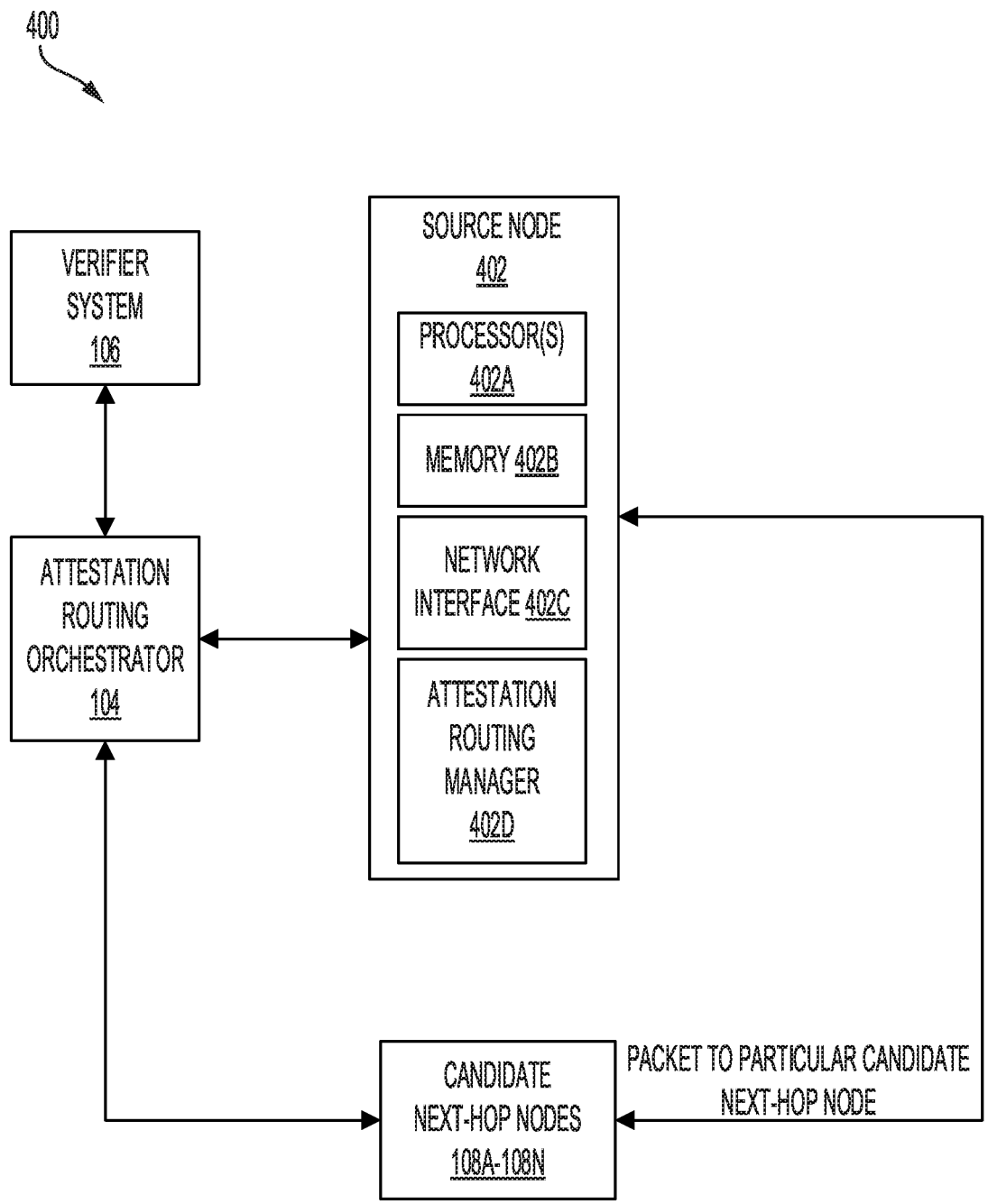
FIG. 4 illustrates an example of a controller orchestrated attestation-based routing, in accordance with some examples.

FIG. 4 is a block diagram of an example controller-orchestrated attestation-based routing 400, in accordance with some implementations. In some examples, the source node 402 is similar to, or adapted from, the source node 102 in FIG. 1. As illustrated in FIG. 4, the attestation routing orchestrator 104 is separate from, but coupled (e.g., connected) to, the source node 402. In some examples, the attestation routing orchestrator 104 can include a controller with knowledge of the network 114 that includes the candidate next-hop nodes 108A-N and optionally the candidate second-hop nodes 110A-N and/or the candidate N-hop nodes 112A-N.

For example, in some implementations, the attestation routing orchestrator 104 can be a network management system (NMS). As another example, in some implementations, the attestation routing orchestrator 104 can be an intent-based networking system, such as Cisco's Digital Network Architecture (DNA). As yet another example, in some implementations, the attestation routing orchestrator 104 can be a wireless LAN controller (WLC), and the candidate next-hop nodes 108A-N and optionally the candidate second hop nodes 110A-N and/or the candidate N-hop nodes 112A-N can be networking devices such as access points, user devices, switches, routers, firewalls, etc.

The attestation routing orchestrator 104 can obtain attestation data (e.g., canary stamps) from the candidate next-hop nodes 108A-N. Each of the candidate next-hop nodes 108A-N can be included within a respective route between the source node 402 and a destination node (e.g., 114). In some implementations, the respective routes are independent of each other.

The attestation routing orchestrator 104 can determine confidence scores based on the attestation data. For example, in some cases, each of the confidence scores can be based on a comparison between a corresponding one of the attestation data and a trusted state or image vector. In some implementations, the attestation routing orchestrator 104 can obtain the trusted state or image vector from the verifier system 106.

In some examples, the attestation routing orchestrator 104 can obtain attestation data from candidate second-hop nodes (e.g., 110A-N) and/or candidate N-hop nodes (112A-N). Each of the candidate second-hop nodes and/or the candidate N-hop nodes can be included within a respective route between a corresponding one of the candidate next-hop nodes 108A-N and the destination node. Moreover, each of the confidence scores can additionally be based on a comparison between a corresponding one of the attention data and the trusted state or image vector in combination with a comparison between another corresponding one of the attestation data from the candidate next-hop nodes 108A-N and the trusted state or image vector.

The attestation routing orchestrator 104 can select, from the confidence scores, a particular confidence score that satisfies one or more selection criteria. The particular confidence score is associated with a particular candidate next-hop node of the candidate next-hop nodes 108A-N.

The attestation routing orchestrator 104 can directs, to the particular candidate next-hop node, a data packet destined for the destination node. For example, in some cases, the attestation routing orchestrator 104 can provide attested route information (e.g., validated canary stamp data, security measurements, etc.) to an attested route manager 402D of the source node 402 in order to facilitate the source node 402 sending the data packet to the particular candidate next-hop node. The attested route information can be indicative of the trustworthiness of each of the candidate next-hop nodes 108A-N.

For example, in some implementations, the attested route information includes an identifier (e.g., an IP address, a MAC address, an SSID, etc.) identifying a secure candidate next-hop node of the candidate next-hop nodes 108A-N. In this example, the source node 402 can provide the data packet based on the identifier in order to route the data packet to the secure, particular candidate next-hop node.

As another example, in some implementations, the attested route information can include confidence scores associated with the candidate next-hop nodes 108A-N. In this example, the attested route manager 402D can select a particular candidate score based on one or more selection criteria. Moreover, the attested route manager 402D can provide the data packet to the particular next-hop node associated with the particular candidate score. In some examples, the attestation routing orchestrator 104 can cease to direct additional data packets to the particular candidate next-hop node in response to determining that the particular confidence score falls below a confidence threshold.

In some cases, the source node 402 can include one or more processors 402A. The one or more processors 402A can provide processing resources for managing attested route information obtained from the attestation routing orchestrator 104. The source node 402 can also include a memory 402B. The memory 402B can include, for example, a non-transitory memory such as RAM, ROM, etc. In some examples, the memory 402B can store data such as the obtained attested route information and data packets to be transmitted. The source node 402 can also include a network interface 402C for obtaining the attested route information and sending/receiving other data.

In some cases, whether a network device has been compromised can be determined based on indicators associated with the network device and time information. The indicators can include, but are not limited to, a set of security measurements or evidence footprints which indicate whether a particular device is compromised. Such indicators can come from one or more sources such as, for example and without limitation, TPM, canary stamps, Syslog, YANG Push, EEM, peer devices, traffic counters, and other sources. Visibility can be a method of identifying a compromise in a timely manner.

Figure 5:
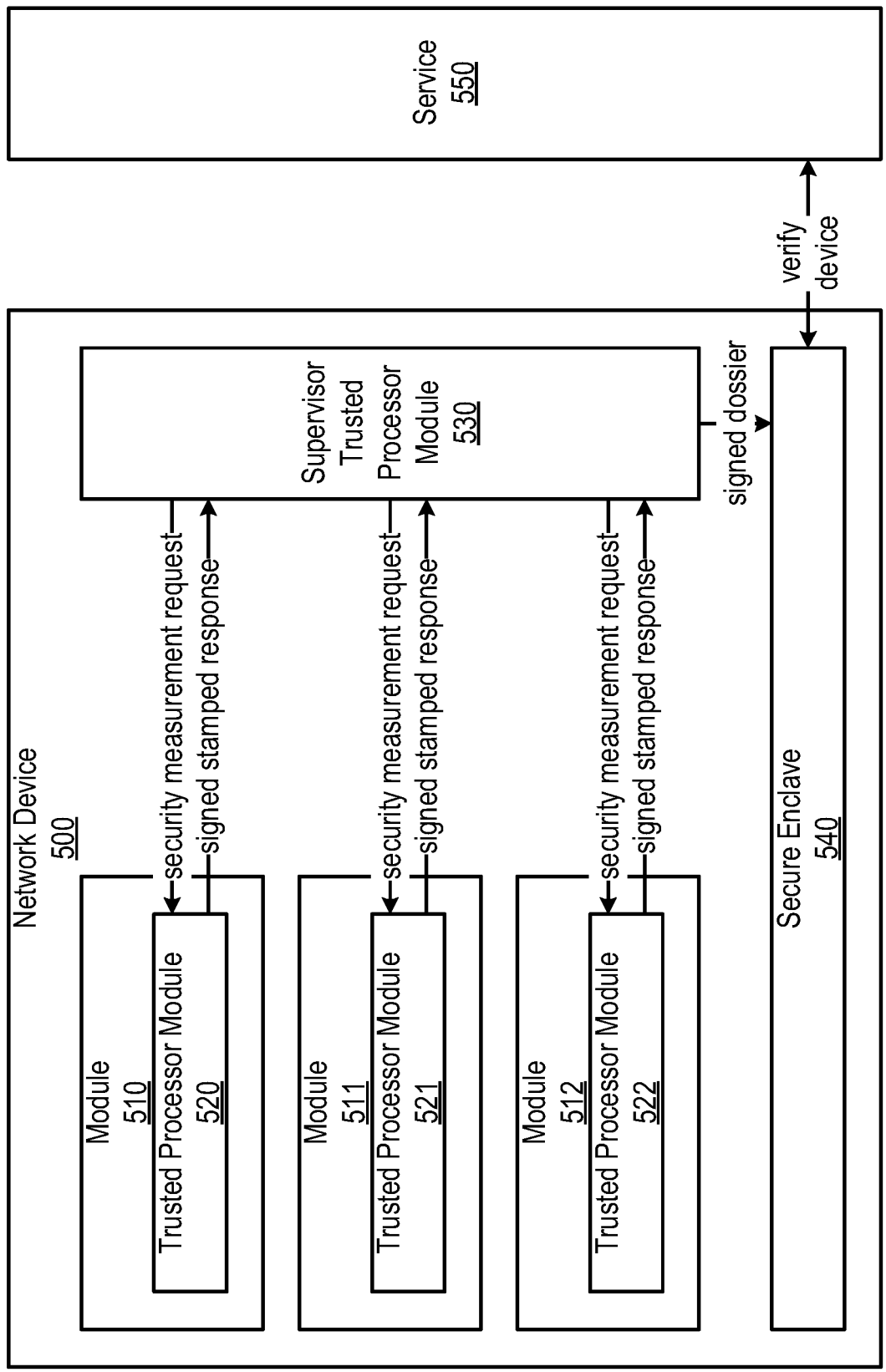
FIG. 5 illustrates an example system in accordance with some aspects of the present technology.
Figure 6:
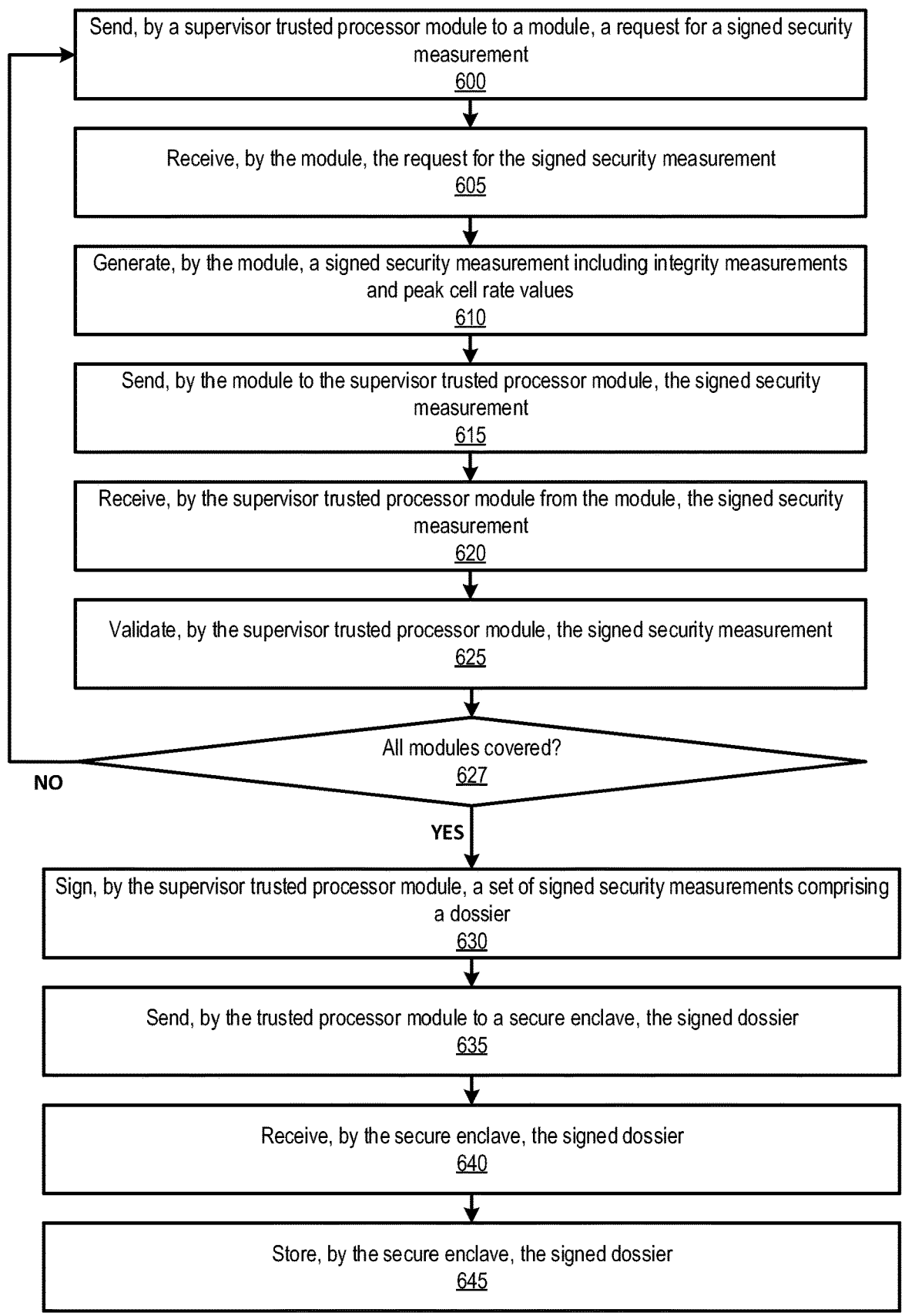
FIG. 6 illustrates an example method in accordance with some aspects of the present technology.

The disclosure now turns to FIGS. 5 and 6, which illustrate an example system and method for implementing some aspects of the present technology.

Modular devices or devices with multiple hardware roots of trust pose particular challenges for security assessment. The presence of multiple hardware roots of trust means that all must be verified independently to ensure that no portion of the overall device has been compromised. Modular devices pose an even greater challenge, where portions of the device may be replaced but security assessments must last the lifetime of the deployed device.

The present technology solves a need in the art for secure verification of modular devices with multiple hardware roots of trust across the lifetime of the device. Using double-signed security measurements along with an enrollment key spanning the lifetime of the logical device (as opposed to the physical device), FIGS. 5 and 6 detail a system and method, respectively, for this technology.

FIG. 5 illustrates an example system in accordance with some aspects of the present technology. A network device with a trusted processor module contains modules with their own trusted processor modules. The modules can be verified by the network device, which in turn saves a dossier of validation information in a secure enclave. External sources, such as other network devices or services (e.g., verifier system 106 described above with reference to FIGS. 1-4), can verify the integrity of the network device using the dossier stored in the secure enclave.

Network device 500 contains a trusted processor module 530, a secure enclave 540, and modules 510, 511, and 512 with their own trusted processor modules 520, 521, and 522, respectively. Network device 500 can be a router, border gateway, edge node, or any other device on a managed network. In some embodiments, modules 510, 511, and 512 can be replaced over the lifetime of network device 500; in others, the modules are built-in to network device 500 and are not replaceable.

Modules 510, 511, and 512 exist in network device 500 with their own trusted processor modules 520, 521, and 522, respectively. These trusted processor modules 520, 521, and 522 represent hardware roots of trust for modules 510, 511, and 512, as discussed above. In some embodiments, modules 510, 511, and 512 can be line cards or route processors to receive, transmit, or control network flows.

Trusted processor module 530 is the hardware root of trust for network device 500. Unlike trusted processor modules 520, 521, and 522, it is not embedded in a module but exists in network device 500. Secure enclave 540 prevents exfiltration of stored data from networking device 500. Secure enclave 540 can securely replicate stored data to a backup entity, such as a backup module 510, within networking device 500.

Trusted processor module 530 can request a security measurement from a trusted processor module 520 on a module 510. A security measurement assesses the status of module 510, determining whether or not it has been compromised. A security measurement can include integrity measurements from trusted processor module 520, among other data. The request can include a nonce plus signed timeticks, and reset and restart counters. These elements of the request can insure that security measurements are not replayed or reused from a different request.

Trusted processor module 530 can receive signed, stamped security measurements from each of modules 510, 511, and 512. Trusted processor module 530 can verify and sign each of the received security measurements if it agrees that the signature keys of modules 510, 511, and 512 are valid, and modules 510, 511, and 512 can store public keys for this purpose in trusted processor module 530. The verified security measurements are compiled into a dossier by trusted processor module 530, which then signs the dossier. The dossier represents the state of networking device 500, and includes security measurements and signatures from all hardware roots of trust on device 500.

The dossier can be signed by an enrollment key stored in trusted processor module 530. This enrollment key identifies the logical device 500 instead of the physical device 500. This allows the enrollment key to persist for the duration of the lifecycle of networking device 500, independent of replacement parts or new modules 510, 511, or 512. The enrollment key is enrolled in a service 550 that will report on trust evidence for networking device 500 by a remote attestation process.

In some embodiments, the key enrollment comprises an asymmetric cipher with a private key component stored in secure enclave 540 used to sign a certificate chain issued by a certificate authority and a corresponding x.509 certificate which is either a self-signed certificate authority or root certificate signed by a customer's root certificate authority. Individual signing keys can be created by the self-signed root and are used to control key entropy over time without requiring a re-enrollment of a new signing key with the service.

Secure enclave 540 can securely store and replicate the signed dossier received from trusted processor module 530. When an external service 550 wants to verify the integrity of network device 500, it can request the dossier from secure enclave 540, which can return verification information to service 550 signed by the enrollment key.

FIG. 6 illustrates an example method in accordance with some aspects of the present technology.

At process 600, supervisor trusted processor module 530 sends a request for a signed security measurement to a module 510. This request can contain a nonce plus signed timeticks, and reset and restart counters. These elements of the request can insure that security measurements are not replayed or reused from a different request.

At process 605, the module 510 receives the request for the signed security measurement. In response, at process 610, module 510 generates the signed security measurement by trusted processor module 520. The signed security measurement can include integrity measurements or other security information pursuant to module 510. At process 615, module 510 sends the signed security measurement to trusted processor module 530, and trusted processor module 530 receives the signed security measurement at process 620.

At process 625, supervisor trusted processor module 530 validates the signed security measurement received from module 510. Trusted processor module 530 can validate the signed security measurement by comparing the signature keys of module 510 with public keys for this purpose in trusted processor module 530.

After process 625, the method can return to process 600 with a separate module 511. Processes 600 through 625 need to occur at least once to cover at least one module 510. At process 627, supervisor trusted processor module 530 determines if all modules in device 500 have been covered. If not (No at process 627), the process reverts back to process 600 and processes 600 to 627, as described above, are repeated until all modules are covered. Once all modules are covered (Yes at process 627), the method proceeds to process 630 accordingly.

At process 630, supervisor trusted processor module 530 signs all received and verified signed security measurements compiled in a dossier. This dossier is signed by an enrollment key stored in trusted processor module 530. This enrollment key identifies the logical device 500 instead of the physical device 500, which allows the enrollment key to persist for the duration of the lifecycle of networking device 500, independent of replacement parts or new modules 510. The enrollment key is enrolled in a service 550 that will report on trust evidence for networking device 500 by a remote attestation process.

At this point, each set of security measurements has been signed twice (double signed). First, it is signed by the trusted processor module on the module the security measurements are for. Then, after verification by supervisor trusted processor module 530, it is signed by supervisor trusted processor module 530 on the dossier.

At process 635, trusted processor module 530 sends the signed dossier to secure enclave 540, which receives the signed dossier at process 640. At process 645, secure enclave 540 securely stores the signed dossier for later device validation and replication. A remote service such as service 550 (e.g., verifier 106 of FIGS. 1-4) can then use this dossier to ensure the security of device 500. Remote attestation of the device 500 as a whole, or of an individual module 510, is then possible.

Figure 7:
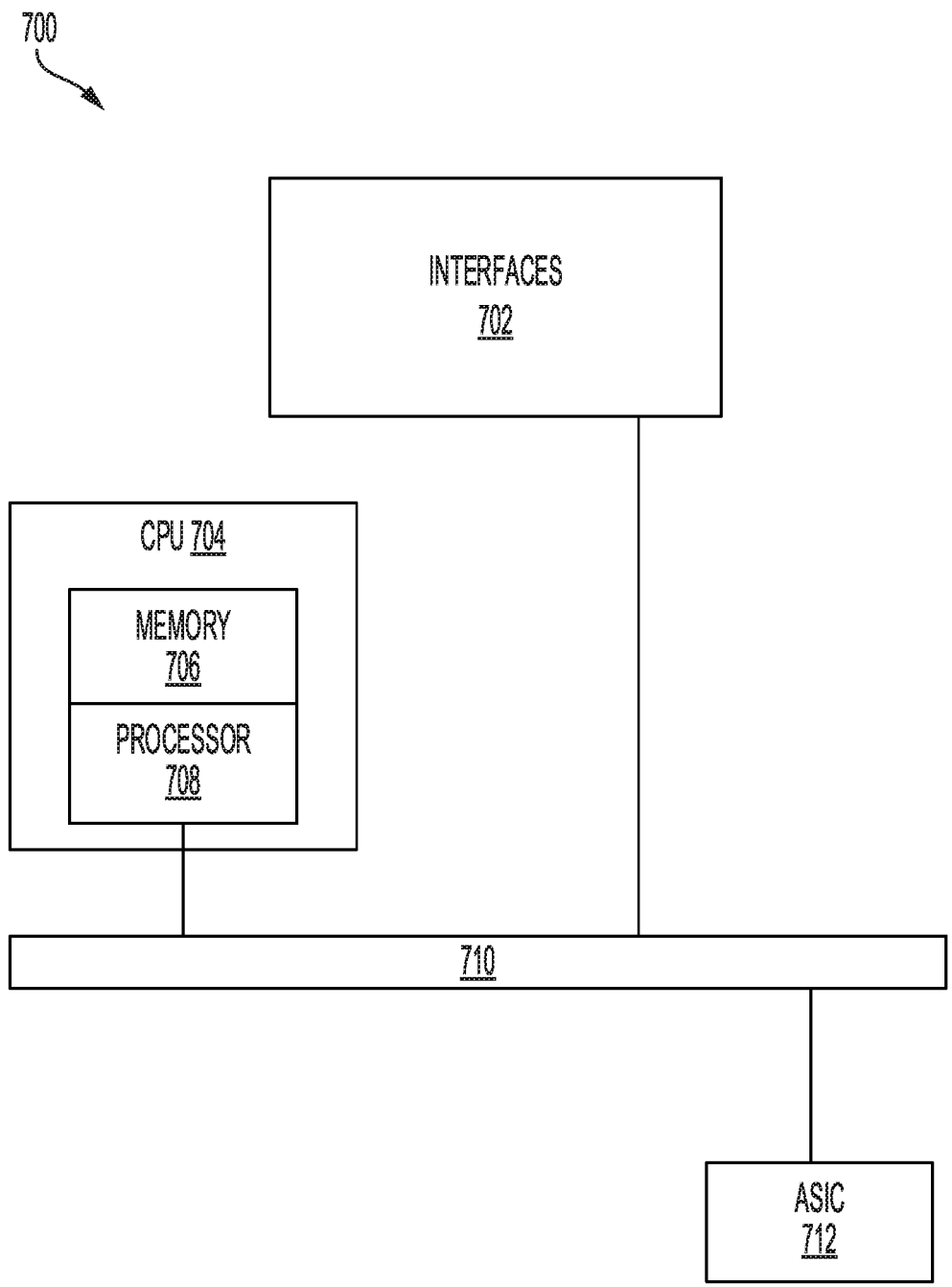
FIG. 7 illustrates an example network device in accordance with some examples.
Figure 8:
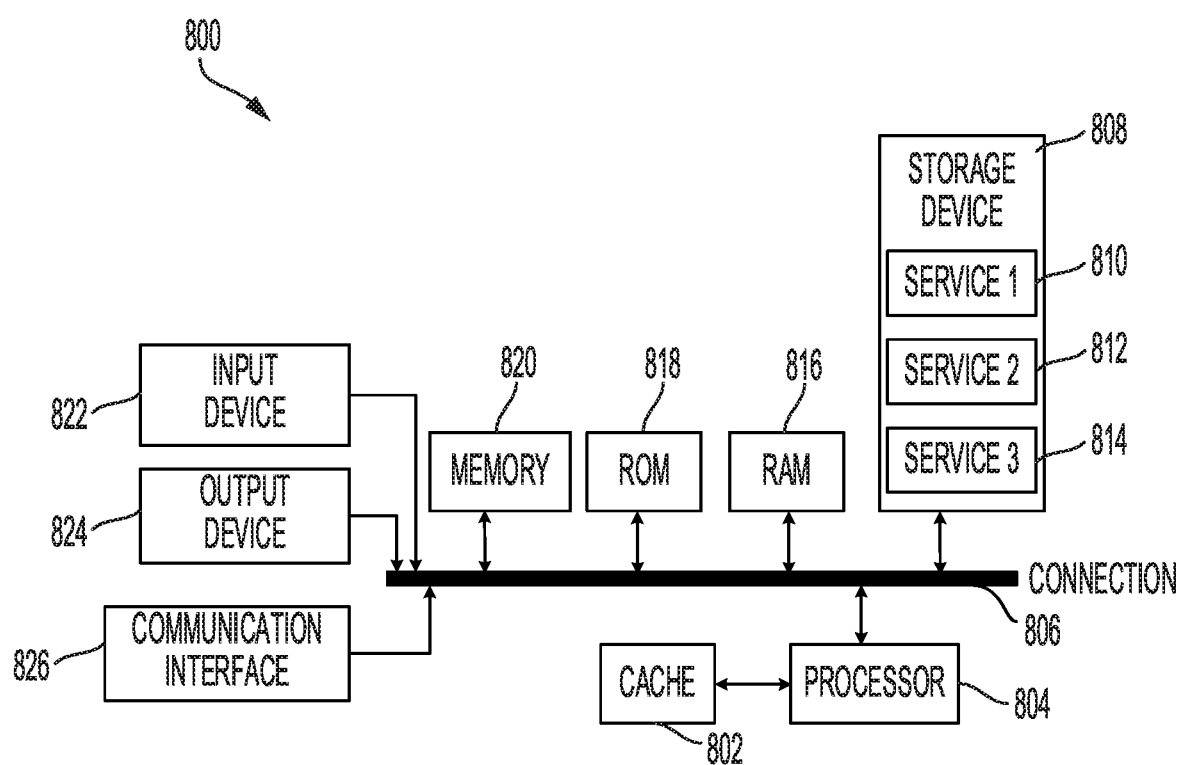
FIG. 8 illustrates an example computing device architecture in accordance with some examples.

The disclosure now turns to FIGS. 7 and 8, which illustrate example network nodes and computing devices, such as switches, routers, client devices, endpoints, servers, and so forth.

FIG. 7 illustrates an example network device 700 suitable for performing switching, routing, and other networking operations. Network device 700 includes a central processing unit (CPU) 704, interfaces 702, and a connection 710 (e.g., a PCI bus). When acting under the control of appropriate software or firmware, the CPU 704 is responsible for executing packet management, error detection, and/or routing functions. The CPU 704 can accomplish these functions under the control of software including an operating system and any appropriate applications software. CPU 704 may include one or more processors 708, such as a processor from the INTEL X86 family of microprocessors. In some cases, processor 708 can be specially designed hardware for controlling the operations of network device 700. In some cases, a memory 706 (e.g., non-volatile RAM, ROM, etc.) also forms part of CPU 704. However, there are many different ways in which memory could be coupled to the system.

The interfaces 702 are typically provided as modular interface cards (sometimes referred to as "line cards"). Generally, they control the sending and receiving of data packets over the network and sometimes support other peripherals used with the network device 700. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 704 to efficiently perform routing computations, network diagnostics, security functions, etc.

Although the system shown in FIG. 7 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 700.

Regardless of the network device's configuration, it may employ one or more memories or memory modules (including memory 706) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 706 could also hold various software containers and virtualized execution environments and data.

The network device 700 can also include an application-specific integrated circuit (ASIC) 712, which can be configured to perform routing and/or switching operations. The ASIC 712 can communicate with other components in the network device 700 via the connection 710, to exchange data and signals and coordinate various types of operations by the network device 700, such as routing, switching, and/or data storage operations, for example.

FIG. 8 illustrates a computing system architecture 800 including various components in electrical communication with each other using a connection 806, such as a bus. Example system architecture 800 includes a processing unit (CPU or processor) 804 and a system connection 806 that couples various system components including the system memory 820, such as read only memory (ROM) 818 and random access memory (RAM) 816, to the processor 804. The system architecture 800 can include a cache 802 of high-speed memory connected directly with, in close proximity to, or integrated as part of the processor 804. The system architecture 800 can copy data from the memory 820 and/or the storage device 808 to the cache 802 for quick access by the processor 804. In this way, the cache can provide a performance boost that avoids processor 804 delays while waiting for data. These and other modules can control or be configured to control the processor 804 to perform various actions.

Other system memory 820 may be available for use as well. The memory 820 can include multiple different types of memory with different performance characteristics. The processor 804 can include any general purpose processor and a hardware or software service, such as service 1 810, service 2 812, and service 3 814 stored in storage device 808, configured to control the processor 804 as well as a special-purpose processor where software instructions are incorporated into the actual processor design. The processor 804 may be a completely self-contained computing system, containing multiple cores or processors, a bus, memory controller, cache, etc. A multi-core processor may be symmetric or asymmetric.

To enable user interaction with the computing system architecture 800, an input device 822 can represent any number of input mechanisms, such as a microphone for speech, a touch-sensitive screen for gesture or graphical input, keyboard, mouse, motion input, speech and so forth. An output device 824 can also be one or more of a number of output mechanisms known to those of skill in the art. In some instances, multimodal systems can enable a user to provide multiple types of input to communicate with the computing system architecture 800. The communications interface 826 can generally govern and manage the user input and system output. There is no restriction on operating on any particular hardware arrangement and therefore the basic features here may easily be substituted for improved hardware or firmware arrangements as they are developed.

Storage device 808 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 816, read only memory (ROM) 818, and hybrids thereof.

The storage device 808 can include services 810, 812, 814 for controlling the processor 804. Other hardware or software modules are contemplated. The storage device 808 can be connected to the system connection 806. In one aspect, a hardware module that performs a particular function can include the software component stored in a computer-readable medium in connection with the necessary hardware components, such as the processor 804, connection 806, output device 824, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

The invention claimed is:

1. A method comprising:
   requesting at least one signed security measurement from at least one module with a corresponding cryptoprocessor, the at least one module existing within a physical device;
   receiving the at least one signed security measurement from the at least one module with the corresponding cryptoprocessor;
   validating the at least one signed security measurement; and
   generating a signed dossier including all validated signed security measurements in a secure enclave, the signed dossier being used by an external network device for remote attestation of the physical device;
   wherein the generating the signed dossier includes signing the dossier with a key which represents a virtual device representation of the physical device and is not tied to a specific hardware component associated with the physical device.

2. The method of claim 1, wherein the at least one signed security measurement contains integrity measurements from the corresponding cryptoprocessor.

3. The method of claim 1, wherein the requesting the at least one signed security measurement includes sending a nonce plus signed timeticks, as well as reset and restart counters.

4. The method of claim 1, wherein the key comprises an asymmetric cipher with a private key component stored in the secure enclave used for generating the signed dossier.

5. The method of claim 1, wherein the signed dossier is securely distributed between multiple secure enclaves.

6. A non-transitory computer-readable storage medium comprising instructions stored therein which, when executed by at least one processor, cause the at least one processor to perform operations comprising:
   request a plurality of signed security measurements from a plurality of modules with corresponding cryptoprocessors, the plurality of modules existing within a physical device;
   receive the plurality of signed security measurements from the plurality of modules with corresponding cryptoprocessors;
   validate the plurality of signed security measurement; and
   generate a signed dossier including all validated signed security measurements in a secure enclave, the signed dossier being used by an external network device for remote attestation of the physical device;
   wherein the generate the signed dossier includes signing the dossier with a key which represents a virtual device representation of the physical device and is not tied to a specific hardware component associated with the physical device.

7. The non-transitory computer-readable storage medium of claim 6, wherein the plurality of modules contain at least one line card or a route processor.

8. The non-transitory computer-readable storage medium of claim 7, wherein the key comprises an asymmetric cipher with a private key component stored in the secure enclave used for generating the signed dossier.

9. The non-transitory computer-readable storage medium of claim 7, wherein the signed dossier is securely distributed between multiple secure enclaves.

10. The non-transitory computer-readable storage medium of claim 6, wherein the plurality of signed security measurements contain integrity measurements from the corresponding cryptoprocessor.

11. The non-transitory computer-readable storage medium of claim 6, wherein the request of the plurality of signed security measurements includes sending a nonce plus signed timeticks, as well as reset and restart counters.

12. A system comprising:
a computing device, the computing device comprising:
- at least one module with a corresponding cryptoprocessor;
- a secure enclave; and
- a supervisor cryptoprocessor configured to:
  - request at least one signed security measurement from the at least one module with the corresponding cryptoprocessor, the at least one module existing within a physical device;
  - receive the at least one signed security measurement from the at least one module with the corresponding cryptoprocessor;
  - validate the at least one signed security measurement; and
  - generate a sign dossier including all validated signed security measurements in the secure enclave, the signed dossier being used by an external network device for remote attestation of the physical device;
  - wherein the generate the signed dossier includes signing the dossier with a key which represents a virtual device representation of the physical device and is not tied to a specific hardware component associated with the physical device.

13. The system of claim 12, wherein the at least one module is a line card or a route processor.

14. The system of claim 13, wherein the key comprises an asymmetric cipher with a private key component stored in the secure enclave used for generating the signed dossier.

15. The system of claim 13, wherein the signed dossier is securely distributed between multiple secure enclaves.

16. The system of claim 12, wherein the at least one signed security measurement contains integrity measurements from the corresponding cryptoprocessor.

17. The system of claim 12, wherein the request of the at least one signed security measurement includes a nonce plus signed timeticks, as well as reset and restart counters.

* * * * *